Patented July 28, 1931

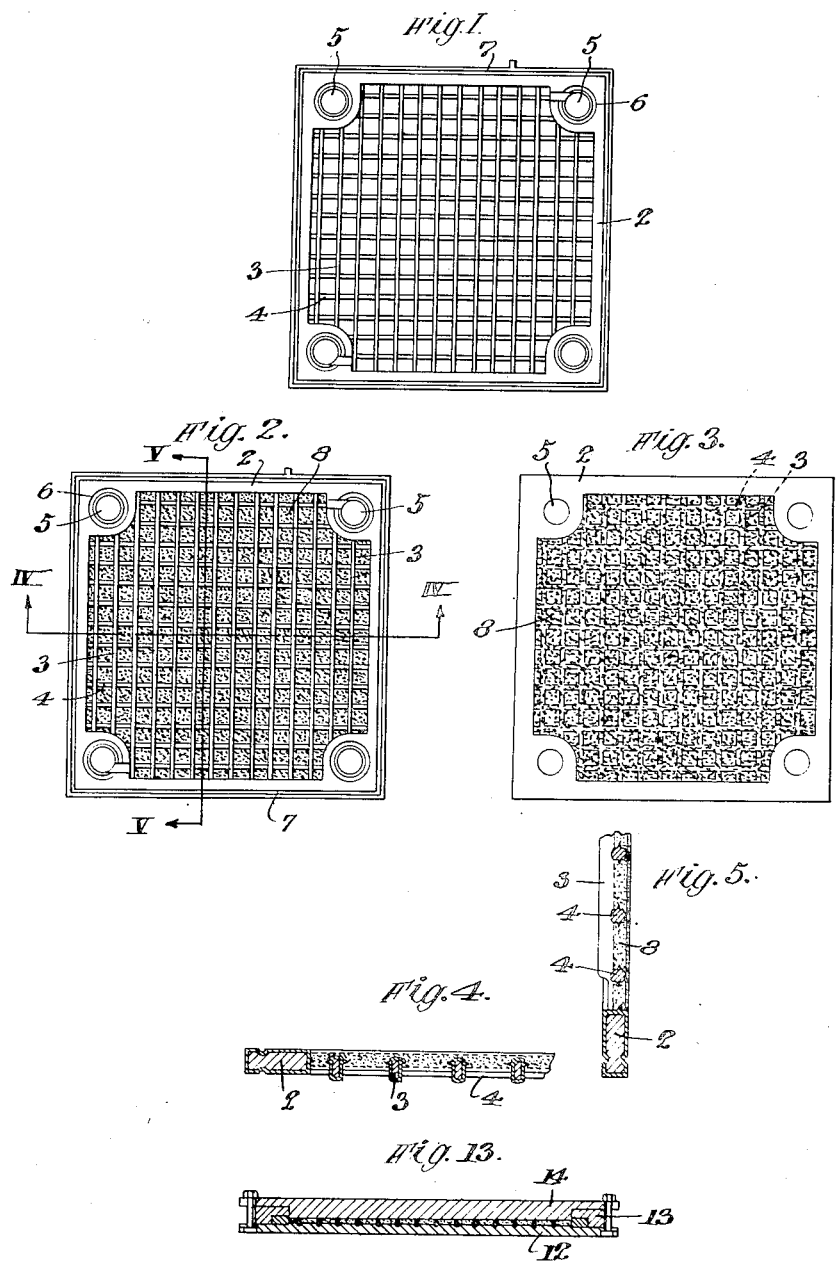

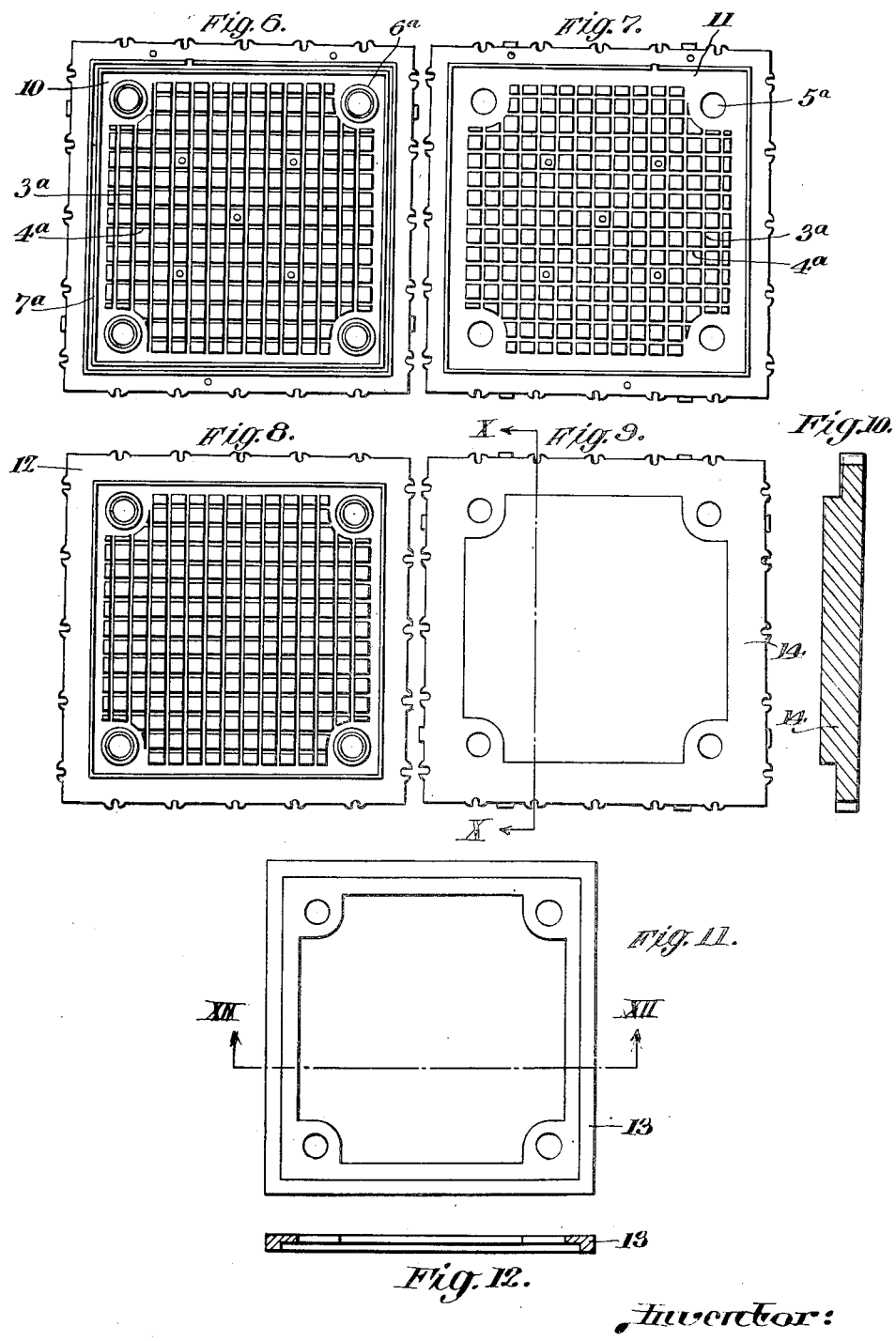

1,815,959

UNITED STATES PATENT OFFICE

MEYER WILDERMAN, OF HAMPSTEAD, LONDON, ENGLAND, ASSIGNOR, BY MESNE ASSIGNMENTS, TO THE AMERICAN WILDERMAN POROUS EBONITE COMPANY. INC., OF PHILADELPHIA, PENNSYLVANIA, A CORPORATION OF PENNSYLVANIA

PROCESS OF MAKING POROUS FILTERS, DIAPHRAGMS, AND THE LIKE

Application filed January 23, 1929, Serial No. 334,448, and in Great Britain December 20, 1928.

In my patent application "Improvements in and in connection with the process of production of separators, diaphragms, filters and the like consisting of porous or porous and non-porous ebonite and the like", No. 334,447 filed January 23, 1929, I described a process of manufacture using metal foil moulds instead of steel moulds, the latter being too costly and difficult to make. This invention has to do with a similar process, when the use of steel moulds is unavoidable on account of the size, weight or shape of the article to be produced.

The non-porous parts of the article consist, in this case either of rubber-ebonite and the like alone, or of metal covered with rubber-ebonite and the like, or of a combination of the two, and form a unitary structure with the porous parts made of rubber-ebonite and the like.

The process is in general based on the following principles:—

Whenever porous articles having no non-porous parts are to be manufactured, semi-vulcanized particles and the like are brought in a state of fine subdivision, under conditions described below, into a hot mould of the article to be produced, and the vulcanization is carried through under the conditions described below requisite for the formation of strong porous bodies. Whenever the article consists of porous and non-porous parts, the non-porous part is first made either of non-vulcanized non-porous rubber-ebonite, and the like, or of metal covered with non-vulcanized non-porous rubber-ebonite and the like, the covering being of suitable shape and thickness and made to assume its final shape and form by compression in the mould of the non-porous part of the article. It is then placed, either in a non-vulcanized or a semi-vulcanized state, in the hot mould of the final article. It is here brought into good contact with the semi-vulcanized particles of rubber-ebonite and the like, which are subsequently spread in the same mould in a state of fine subdivision, under conditions described below, and compressed to its final shape and form by the top part or parts of the mould. The whole is then vulcanized under conditions described below requisite for the semi-vulcanized particles and the like to combine to strong porous parts as well as to strongly unite with the non-porous parts. Should the non-porous parts be first fully vulcanized, they must be covered at the places of contact with the porous parts with non-vulcanized rubber-ebonite before they can be combined with the semi-vulcanized particles, but the results are less satisfactory.

By "semi-vulcanized particles", I mean particles prepared on the rollers of a mixing mill from a rubber-ebonite mixture of suitable composition which has been only partially vulcanized, or from a mixture of vulcanized soft rubber of suitable composition and non-vulcanized rubber-ebonite of suitable composition, which has first been made to an homogeneous mass and then partially vulcanized, or particles of vulcanized hard rubber covered with a layer of non-vulcanized rubber-ebonite mixture, which has been partially vulcanized. By "the like", I mean other particles having the property of combining with one another under the action of heat. This partial vulcanization should preferably go on only so long as it is requisite to permit grinding the material into powder on the rollers of the mixing mill, so as to get strong porous bodies.

By way of illustration I shall describe the process of manufacture of plates for filter presses.

Such filter press plates and the moulds in which they are made are shown in the accompanying drawings.

Figure 1 is a plan view of the rim and grid of the filter press plate;

Figure 2 is a plan view of the finished filter plate seen from the same side as Figure 1;

Figure 3 is a plan view of the other side of the filter plate;

Figure 4 is a partial cross-section on line IV—IV of Figure 2;

Figure 5 is a partial cross-section on line V—V of Figure 2;

Figure 6 is a plan view of the bottom half of the mould for moulding the non-porous parts of the filter plate;

Figure 7 is a plan view of the top half of the same mould;

Figure 8 is a plan view of the lowest part of the mould for moulding the finished filter plate;

Figure 9 is a plan view of the top piece of the same mould;

Figure 10 is a cross-section on line X—X of Figure 9;

Figure 11 is a plan view of the intermediate mould piece;

Figure 12 is a cross-section on line XII—XII of Figure 11; and

Figure 13 is a cross-sectional view of the mould assembly showing the finished filter plate in position.

The plate shown in Figure 1 consists of a metal rim 2 containing within it the grid rods 3 and 4. The grid members 3 and the rim are made of a suitable metal and are covered with ebonite, whereas the grid members 4 are solid ebonite. On the side of the plate shown in Figure 1, the members 3 project beyond the members 4, as shown in Figures 4 and 5, but on the opposite side of the plate the outer edges of the members all lie in the same plane.

The rim contains four circular holes 5, with grooves 6 around them and also a groove 7 all around the outer rim on the back side only.

Figures 2 and 3 represent the final article, the filter plate, made from the rim and grid shown in Figure 1 by filling up the open spaces with porous fields 8. Figure 2 shows the filter from its back side, corresponding to the side shown in Figure 1. Here the horizontal rods 4 of the grid project a little beyond the porous fields 8 (see Figure 5), while the vertical rods 3 of the grid project beyond the horizontal rods 4 (see Figure 4). Figure 3 shows the front side of the filter. The front surfaces of the vertical and horizontal rods of the grid and of the porous fields lie in the same plane, and hence the whole surface within the rim shows one porous surface covering the horizontal and vertical rods of the grid.

The rim and grid are produced in the steel mould shown in Figures 6 and 7 representing the bottom and top parts of the mould respectively. Both parts of the mould represent the negatives of the rim and grid, the side of the filter plate shown in Figure 1 being produced in the bottom part of the mould shown in Figure 6 and the other side of the filter plate being produced in the top part of the mould, shown in Figure 7. The parts of the mould shown in Figures 6 and 7 which correspond to parts of the filter plate illustrated in Figures 1, 2 and 3, have been indicated with the same reference numerals with "a" suffixed thereto.

At first the metal rim and the metal vertical rods are covered with non-vulcanized rubber-ebonite of a suitable thickness, then placed into the lower part 10 of the mould Figure 6 which is kept hot. The metal rim and rods are supported in the mould at a number of small surfaces to keep the metal in its correct position within the rubber-ebonite covering while under compression. The horizontal rods, made of non-vulcanized rubber-ebonite only, of a suitable shape, are combined in the mould part 10 Figure 6 with the non-vulcanized covering of the metal rim and vertical rods, compressed to their shape and form by the hot top part 11 of the mould Figure 7, and then partially vulcanized. The rim and grid are then taken out of the mould, the places in the metal rim and in the vertical rods which were used for their support in the mould and which, for this reason, were left uncovered, are now also covered with non-vulcanized rubber-ebonite the superfluous semi-vulcanized rubber-ebonite removed, any defects in the semi-vulcanized covering repaired and the whole placed into the lower part 12 of the mould Figure 8. The intermediate frame 13 is placed on the part 12 and semi-vulcanized particles are placed within the frame. The particles are compressed to the desired extent by means of the top part 14, bringing the particles to the volume desired for the porous parts, thus giving to the semi-vulcanized particles their final shape and porosity and bringing them into intimate contact with the semi-vulcanized rubber-ebonite. The whole is then vulcanized to strong porous fields strongly combined with the non-porous parts of the filter (see Fig. 13, where the closed mould with the formed filter in it is shown).

The rim and the vertical rods covered with non-vulcanized rubber-ebonite, can also be placed directly into the hot lower part 12 of the mould Figure 8, supported at the requisite number of points, and then connected with the horizontal rods made of non-vulcanized rubber-ebonite and compressed by a compound top part of a mould, made of movable and non-movable parts, and kept cold. The fields of the mould, where the porous fields of the filter plate are to be formed, are first covered by one or more parts of this top part of the mould while the compression of the non-vulcanized rubber-ebonite to its final shape and form is done afterwards by the movable part or parts of this top part of the mould. This top part of the mould is then removed and the semi-vulcanized particles are brought into the mould in the manner described above and compressed to their final shape and form, by the use of the intermediate frame Fig. 11 and the top part of the mould Fig. 9. The whole is then partially vulcanized after which the places of the rim and of the vertical rods used for support are covered with non-vulcanized rubber-ebonite, and finally the vulcanization is completed in the same mould.

Whenever the rim and the grid of the filter plate consist of rubber-ebonite alone, the same are first made from non-vulcanized rubber-ebonite, compressed to their shape in the hot mould Fig. 8 by the cold compound upper mould part as mentioned above. The rim thus adheres to the lower mould Figure 8 and the compound top part of the mould is removed. The semi-vulcanized particles are then placed in the fields of the mould where the porous parts are to be formed and compressed to their final shape and form by the use of the intermediate frame 13 Fig. 11 and the top part 14 of the mould Fig. 9, and then fully vulcanized under conditions as described below.

The semi-vulcanized particles of rubber-ebonite, prepared on the rollers of a mixing mill, agglomeate at ordinary temperature, so that great difficulty is experienced when they are used under normal conditions for the manufacture of uniform porous substances. It was found, however, that if the agglomerated semi-vulcanized particles are brought to a higher temperature—which varies with the composition and time of partial vulcanization—and effectively stirred, they separate again into the original fine particles and in this state they can be uniformly and correctly spread. For this reason it is essential for the success of the process that the walls of the sifting machine which separates the semi-vulcanized particles into different grains, the walls of the apparatus used for storage of the semi-vulcanized particles, and those of the apparatus used for distribution of the particles into the fields of the mould, where the porous parts are to be formed, should all be provided with a jacket, through which steam of the requisite temperature can be conducted. Other heating arrangements can also be used. All these machines should also be provided with effective stirrers, and the distribution of the particles should take place in a mould which is kept hot.

It is further essential that the semi-vulcanized particles should be quite dry and that no steam should come in contact with them during vulcanization. The vulcanization of the filters, diaphragms and the like, in the mould, should therefore be preferably conducted in the air of a jacketed vulcanizer and the mould itself must be so constructed as to protect the semi-vulcanized particles within it against moisture during vulcanization.

It was found that if the articles are vulcanized in the hot air of a jacketed vulcanizer, the rate of rise of the temperature is so slow that the semi-vulcanized particles will not combine to strong porous ebonite. If the increase of temperature is at a slow rate, the individual particles are vulcanized to such an extent that they will not combine even on further heating to form a strong product. For this reason, the temperature should be raised quickly to a degree that causes the individual particles to stick to each other so that upon further heating a strong porous product is formed. This is certainly due to the big mass of metal of the moulds requiring a much greater amount of heat for raising their temperature in the unit of time than can be supplied by the air, which is a bad conductor of heat.

To overcome this difficulty I had to adopt a method of heating the moulds in the air of the jacketed vulcanizer by bringing them into direct metallic contact with plates which are heated either by steam of any desired temperature passing through channels in them, or by any other suitable means, such a transportation and supply of heat being very much quicker and greater than it is when heat is transported through air from the hot walls of the vulcanizer to the mould. The hot air of the jacketed vulcanizer thus functions to prevent the cooling of the moulds in the surrounding medium. The same channels in the heating plates are used for the circulation of cold water after vulcanization, so as to cool the moulds rapidly and shorten the time requisite for carrying through a complete vulcanization.

In speaking of the upper part of the mould it must be understood that according to the conditions it may be made to consist of one or more parts, carrying through the compression either everywhere at the same time, or on different parts of the article in succession, as already mentioned above. Whenever the mould can consist of two parts only and a great number of articles must be produced, I preferably use a series of plates, each representing on one side the bottom part of the mould, and on the other side the top part, thus getting a number of moulds with half the number of mould plates.

In a number of cases the articles consisting of porous and non-porous parts can be made by preparing first the non-porous and the porous parts of the article in separate moulds, preferably in a semi-vulcanized state, and in then combining the same by vulcanization in the mould of the whole article. In exceptional cases the non-porous and porous parts of the article can also be produced in the same mould from semi-vulcanized particles alone, by compression of the particles to non-porous ebonite in some parts of the mould, and by reducing only the volume of the semi-vulcanized particles in the other parts of the mould where the porous parts are to be formed, thus giving to the semi-vulcanized particles their final shape and porosity, and then vulcanizing the whole. In this case also the mould may consist of two parts only or the top part of the mould may have non-movable and movable parts acting in succession. In all these cases, however, the process of manufacture always depends upon the same conditions of formation of the porous parts from semi-vulcanized particles and the like in a state of fine subdivision, and upon the same conditions of vulcanization requisite for getting strong porous bodies from such particles. Whenever the non-porous parts of the article consist of non-vulcanized rubber-ebonite, while the particles for the porous parts are already semi-vulcanized, the vulcanization of the whole article has to be conducted so as to complete the vulcanization of the non-porous parts. The porous parts are thus over-vulcanized. The composition of the non-vulcanized parts must be such that they will vulcanize correspondingly more rapidly than the semi-vulcanized particles; or suitable accelerators of vulcanization must be admixed in the requisite quantity to the raw rubber-ebonite of the non-porous parts to complete the vulcanization of all parts of the article at the same time.

Having now particularly described and ascertained the nature of my said invention and in what manner the same is to be performed I declare that what I claim is:—

1. The process of making porous filters, diaphragms, and the like from powdered, partially vulcanized rubber mixtures, which comprises introducing the powder into a mold while maintaining the powder at a temperature such that it remains in a state of fine subdivision, compressing the powder to form the article, and completing vulcanization.

2. The process of making porous filters, diaphragms, and the like from powdered, partially vulcanized rubber mixtures, which comprises introducing the powder into a mold which is heated to a temperature such that the powder remains in a state of fine subdivision, compressing the powder to form the article, and completing vulcanization.

3. The process of making porous filters, diaphragms, and the like from powdered, partially vulcanized rubber mixtures, which comprises distributing the powder in a mold while the powder is at a temperature such that it remains in a state of fine subdivision, compressing the powder to form the article, and completing vulcanization.

4. The process of making porous filters, diaphragms, and the like from powdered, partially vulcanized rubber mixtures, which comprises distributing the powder in a heated mold, compressing the powder to form the article, and completing vulcanization.

5. The process of making porous filters, diaphragms, and the like from powdered, partially vulcanized rubber mixtures, which comprises distributing the powder in a mold while the powder is at a temperature such that it remains in a state of fine subdivision, compressing the powder to form the article, and vulcanizing it in the absence of moisture.

6. The process of making porous filters, diaphragms, and the like from powdered, partially vulcanized rubber mixtures, which comprises distributing the powder in a mold while the powder is at a temperature such that it remains in a state of fine subdivision, compressing the powder to form the article, and vulcanizing it in the air of a jacketed vulcanizer.

7. The process of making porous filters, diaphragms, and the like from powdered, partially vulcanized rubber mixtures, which comprises distributing the powder in a mold while the powder is at a temperature such that it remains in a state of fine subdivision, compressing the powder to form the article, and thereafter rapidly raising the temperature to cause the powder to combine to form a strong porous body.

8. The process of making porous bodies such as filters, diaphragms and the like, from powdered rubber mixtures, the body having a porous part combined with a non-porous part, which comprises placing in a mold the non-porous part, at least the surface portions of which are not fully vulcanized, introducing the powder into the mold at the place where the porous part is to be formed, the powder having at least its surface portions only partially vulcanized, maintaining the powder at a temperature such that it remains in a state of fine subdivision during its introduction into the mold, compressing the powder to form the body, and completing vulcanization.

In testimony whereof I affix my signature.

MEYER WILDERMAN.